3,137,617
1,5-PENTAMETHYLENETETRAZOLES AS BIRD MANAGEMENT CHEMICALS

Lyle D. Goodhue and Andrew Joe Reinert, Bartlesville, Okla., assignors to Phillips Petroleum Company, a corporation of Delaware
No Drawing. Filed Feb. 26, 1962, Ser. No. 175,834
5 Claims. (Cl. 167—33)

This invention relates to the control of birds. In one of its aspects, this invention relates to a method for clearing an area of birds. In another of its aspects, this invention relates to bird management or bird anti-flying compositions.

The control of birds is one of the major problems confronting farmers and city managers at this time. For instance, the loss of grain and seed by bird consumption represents considerable financial losses to farmers each year. Cities frequently spend many thousands of dollars a year in an attempt to drive away birds and thus prevent the defacing of buildings and the like. Furthermore, there have been several airplane crashes attributed to flocks of birds circling in the landing pattern and near the ends of airports or airfield runways.

Various means have been employed to scare or otherwise drive birds away from certain localities. For example, scarecrows have been used for many years by farmers in grain fields or other areas, although this method has actually met with little success. More modern versions of the scarecrow, such as artificial owls and the like, have also met with little success. Certain types of noisemakers such as sirens and the like have likewise been used. Still more recently, chemical repellents have been developed which, to some extent, alleviate the problem.

This invention relates to novel bird control compositions and to a method for clearing an area of birds by subjecting birds within said area to the action of 1,5-pentamethylenetetrazole compounds.

Accordingly, an object of this invention is to provide novel bird management or anti-flying compositions.

Another object of this invention is to provide an effective method for clearing an area of birds.

A further object of this invention is to provide novel compositions and a method for protecting property from birds, especially materials normally consumed as food by birds.

Other objects, aspects and the several advantages of this invention will be apparent from a study of this disclosure and the appended claims.

According to the present invention, it has been found that the activity of birds can be controlled by subjecting birds to the action of an effective amount of a 1,5-pentamethylenetetrazole compound having the structural formula

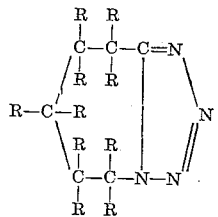

wherein each R is selected from the group consisting of hydrogen and alkyl radicals containing from 1 to 5, inclusive, carbon atoms.

Representative and specific 1,5-pentamethylenetetrazole compounds of the above described general structural formula that can be employed according to the practice of the present invention include:

6,7,8,9 - tetrahydro - 5H-tetrazoloazepine (also named as 1,5-pentamethylenetetrazole or Metrazole)
9-methyl-6,7,8,9-tetrahydro-5H-tetrazoloazepine
6-ethyl-6,7,8,9-tetrahydro-5H-tetrazoloazepine
5,9-dimethyl-6,7,8,9-tetrahydro-5H-tetrazoloazepine
8-isopropyl-6,7,8,9-tetrahydro-5H-tetrazoloazepine
7,9,9-trimethyl-6,7,8,9-tetrahydro-5H-tetrazoloazepine
6-sec-butyl-6,7,8,9-tetrahydro-5H-tetrazoloazepine
8-tert-amyl-6,7,8,9-tetrahydro-5H-tetrazoloazepine
7-methyl-9-propyl-6,7,8,9-tetrahydro-5H-tetrazoloazepine
5,5,6,6,7,7,8,8,9,9 - decamethyl - 6,7,8,9-tetrahydro-5H-tetrazoloazepine and the like.

Many of the compounds of the invention can be purchased from commercial sources, but not all are available. Synthesis of the 1,5-pentamethylenetetrazole compounds can be effected by conventional techniques.

The compounds of the present invention can be applied for their intended purpose as a concentrate, or in combination with a carrier or other inert materials. Solvent or adjuvant carriers employed should be substantially inert with respect to the active anti-flying compound. Some examples of specific carrier materials that can be employed are acetone, deodorized kerosene, naphthas, isoparaffinic hydrocarbon fractions boiling in the range of about 260 to about 800° F. (Soltrol) and the like. If desired, the anti-flying compounds of this invention can be applied as aqueous emulsions by employing a suitable emulsifying agent. It is also within the scope of this invention to employ mixtures of the 1,5-pentamethylenetetrazole compounds and to employ mixtures of one or more of these compounds with other known bird control agents.

It has been found that the various compounds disclosed above are effective "anti-flying" agents. Birds that have eaten even a very small amount of these "anti-flying" or "bird management" agents are unable to fly for some time, and during this period of time (inability to fly) the birds undergo convulsions, emit warning or distress cries to other birds, and the like. It is not known definitely by what mechanism these warning cries or convulsive actions serve to drive other birds away from affected birds but, as shown by the specific examples hereinbelow, the compounds of the invention are extremely effective for clearing birds from an area after at least one of the birds has been subjected to the action of one of the compounds of the invention.

Ingestion of a sufficient amount of at least one of the compounds of the invention defined above by one or more birds prduces symptoms such as tremors, loss of flight, fluttering, paralysis, and warning and distress cries. The result is that other birds, upon seeing birds having convulsions or suffering from paralysis, and hearing the distress cries emitted by affected birds, even entire flocks of birds, will leave an area and stay away from the area for long periods of time.

When employing the bird management or anti-flying compounds of this invention to clear birds from an area, one or more of the birds in the area to be cleared must ingest an effective amount of at least one of the compounds in order to achieve the best results. The active anti-flying compound can be ingested by the birds by feeding the birds treated food or by injecting a small amount of at least one of the compounds into at least one of the bird's bodies by suitable means, e.g., syringe. The compounds of the invention can be conveniently given to birds by treating a food normally eaten by the birds and thereafter placing the treated food or bait in the area from which it is desired to clear the birds. For example, grains such as sorghum, corn kernels, chopped corn, chicken feed, kaffir corn, and the like, can be employed as well as such materials as potatoes, bread and the like. If a grain is used, a convenient method for treating the grain comprises impregnating the grain with a solution of one of the agents and a volatile solvent and thereafter evaporating off the volatile solvent. Acetone is a convenient solvent for use in such a method of operation. If, however, bread is used as a bait, inverted emulsions in mayonnaise or other oily material are suitable methods for applying the anti-flying compounds to the bread.

Whatever method is employed for treating the bird food, the treated food will generally contain from 0.01 to about 10 percent by weight of the anti-flying compound. The lower percentages will, of course, be used when the more active agents are to be employed, while the higher percentages will be used with the less effective agents. Larger or smaller amounts, however, can be employed, when desired, although larger amounts are generally uneconomical.

In actual operation, birds can be effectively cleared from an area, building, or other locality, with a very minor amount of one of the above-described compounds. It can be seen by employing small amounts of treated grain, for example, one need not treat the entire area such as would be required if a true repellent material was employed. By operating in this manner, buildings, airport runways, grain fields, and the like can be cleared of birds and maintained clear of birds for prolonged periods of time. This is particularly advantageous in grain fields since the farmers can place small amounts of treated grain in the fields shortly before the grain ripens, thus clearing the birds from the fields before they have a chance to eat the crop. After the crop has been harvested, the use of treated bait or bird food can be discontinued. In many instances, it is desirable to first lure the birds into an area with a bait or untreated grain, and then place treated bird food in the area for the birds to consume with the result that the affected birds warn and scare other birds away from that particular area.

The following specific examples are intended to illustrate the advantages of the bird management or anti-flying compounds of this invention, but it is not intended to limit the invention to the embodiments shown herein. As discussed above, it has only been specified how much of the anti-flying compound to deposit on treated bait. In the following examples, it will be shown that the compounds of the invention are required in different dosages to obtain the desired symptoms. The amount of active ingredient ingested by a bird needed to obtain the desired results will vary depending upon the compound employed and the species of birds treated, however, the amount ingested ordinarily will range from about 100 to about 500 milligrams (mg.) of the chemical per kilogram (kg.) of bird weight. Since one wishing to clear an area of birds by the method of this invention has no control over the amount of treated food that a bird will eat, it is impossible to specify exactly what dose will be applied to birds under actual conditions. However, one method which can be used for selecting between species of birds is the use of different sized grain. For example, sparrows cannot eat whole kernel corn whereas pigeons can eat such food very rapidly. Thus, if one wishes to clear pigeons from a building or other area where only small populations of sparrows exist, whole corn can be used exclusively.

The following examples illustrate the effectiveness of the compounds of the present invention but are not intended, however, to unduly limit the scope of the invention.

EXAMPLE I

A run was carried out in which one of the compounds of this invention was tested as a bird management chemical.

In this run, the chemical to be tested was given orally, by means of a syringe and stomach tube, to a chick 10 to 15 days old. The effect on the chick was noted and the $LD_{50}$ for the chemical was determined. $LD_{50}$ is the dose required in mg. of chemical per kg. of bird weight to kill 50 percent of the chicks. Although $LD_{50}$ is not a measure of the value of a chemical as a bird control agent, all of the bird management or control agents which we have found have high toxicity to birds. Thus, when a chemical is noted to produce convulsions, cause distress cries, prevent flying, etc., the $LD_{50}$ provides a good measure of effectiveness when comparing the agent to another compound producing these effects.

The results of this test are expressed below in Table I.

Table I

| Compound | $LD_{50}$, mg./kg.=X | Observed Effects |
| --- | --- | --- |
| 1,5-pentamethylenetetrazole | 300<X<500 | Convulsions, distress cries, can't fly. |

EXAMPLE II

In a further series of runs, starlings were treated with the chemical tested in Example I. In these runs, a measured dose of the chemical in water was forced into the stomach by means of a tuberculin syringe. The results of these tests are expressed as Table II. In the table, the numbers are for intensity of reaction; 0—no reaction, 1—slight, 2—noticeable, 3—conspicuous and 4—violent.

Table II

| Compound | Dosage, mg./kg. | Tremors | Loss of Balance | Loss of Flight | Loss of Awareness | Fluttering | Cries | Time of First Reaction, Minutes | Time of Last Reaction, Minutes |
| --- | --- | --- | --- | --- | --- | --- | --- | --- | --- |
| 1,5-pentamethylene-tetrazole | 115 | 3 | 2 | 2 | 2 | 2 | 2 | 8 | 46 |
| Do | 122 | 3 | 3 | 4 | 4 | 3 | 4 | 8 | 38 |
| Do | 215 | 3 | 2 | 3 | 2 | 3 | 3 | 8 | 51 |
| Do | 427 | 4 | 4 | 4 | 4 | 4 | 4+ | 1 | 17 |
| Do | 480 | 4 | 4 | 4 | 4 | 4 | 4+ | 2 | 02 |

EXAMPLE III

In a further series of runs, seagulls were treated with 1,5-pentamethylenetetrazole. Cage tests were run by force feeding a captured seagull a gelatin capsule containing a carefully weighed dose of 1,5-pentamethylenetetrazole, and then observing the reactions of the caged bird. The results of these tests are set forth below in Table III.

Table III

| Compound | Dose in mg./kg. | Type of Gull | Wt. of Gull in kg. | Dose in mg. | Time for Reaction, Min. | Symptoms |
|---|---|---|---|---|---|---|
| Metrazole | 500 | Juvenile Herring | 1.07 | 535 | 4 | Distress calls, flopping symptoms, out of control. |
| Do | 300 | ___do___ | .778 | 234 | 50 | Tremors, "sees spooks," flopping symptoms. |
| Do | 100 | ___do___ | .861 | 86 | ___ | No effect. |

It will be observed from the above table that Metrazole gave a very rapid reaction on seagulls.

EXAMPLE IV

Pans of corn chops, red sorghum and white sorghum treated with an acetone solution of 1,5-pentamethylenetetrazole are set out in a location heavily frequented by pigeons. The amount of solution is sufficient that the grain after evaporation of the solvent contains approximately 1 percent by weight of the bird management agent.

The estimated pigeon population at the time the treated grain is set out is about 150 but after approximately three days the number frequenting the area is down to about 30. Pigeons that have eaten some of the treated food experience convulsions and emit warning cries with the result that other birds in the area leave.

As will be evident to those skilled in the art many variations and modifications of this invention can be practiced in view of the foregoing disclosure. Such variations and modifications are believed to come within the spirit and scope of the invention.

We claim:

1. A bird management composition comprising a bird food containing from 0.01 to 10 percent by weight, based on said food, of a 1,5-pentamethylenetetrazole compound having the structural formula

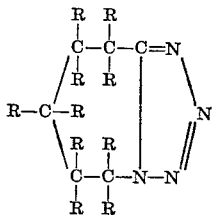

wherein each R is selected from the group consisting of hydrogen and alkyl containing from 1 to 5, inclusive, carbon atoms.

2. A bird management composition comprising a bird food containing from 0.01 to 10 percent by weight, based on said food, of 1,5-pentamethylenetetrazole.

3. A method for reducing the number of birds frequenting an area which comprises causing at least one of the birds in said area to ingest a 1,5-pentamethylenetetrazole compound having the formula

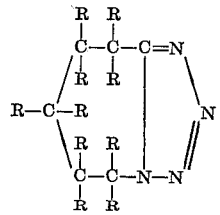

wherein each R is selected from the group consisting of hydrogen and alkyl containing from 1 to 5, inclusive, carbon atoms in an amount sufficient to produce tremors, loss of flight, fluttering and distress and warning cries, thereby causing other birds to leave said area.

4. A method for reducing the number of birds in an area which comprises placing in said area a bird food containing from 0.01 to 10 percent by weight, based on said food, of 1,5-pentamethylenetetrazole.

5. A method according to claim 4 wherein the birds are attracted into the area to be cleared with untreated bait.

References Cited in the file of this patent

The Merck Index, 7th Ed., 1960, published by Merck and Company, Inc., Rahway, New Jersey, U.S.A., page 784.

Dispensatory of the U.S.A., 25th Ed., Parts II–III, pages 2003–2004, 1955.